United States Patent [19]

Gutjahr et al.

[11] 4,273,582

[45] Jun. 16, 1981

[54] PROCESS FOR THE MANUFACTURE OF SINTERED METAL BODIES, IN PARTICULAR BATTERY ELECTRODES

[75] Inventors: Manfred A. Gutjahr, Wendlingen; Hans Heinrich, Esslingen, both of Fed. Rep. of Germany

[73] Assignee: Daimler-Benz Aktiengesellschaft, Stuttgart, Fed. Rep. of Germany

[21] Appl. No.: 784,774

[22] Filed: Apr. 5, 1977

[30] Foreign Application Priority Data

Apr. 10, 1976 [DE] Fed. Rep. of Germany ....... 2615779

[51] Int. Cl.³ .............................................. B22F 1/00
[52] U.S. Cl. ....................................... 75/222; 75/225; 75/200
[58] Field of Search ......................... 75/222, 225, 200; 29/592 R; 427/92; 429/223; 204/1 R, 2.1

[56] References Cited

U.S. PATENT DOCUMENTS

| | | | |
|---|---|---|---|
| 3,287,166 | 11/1966 | Arrance | 75/222 |
| 3,359,099 | 12/1967 | Lindstrom | 75/222 |
| 3,451,810 | 6/1969 | Smith | 75/222 |
| 3,802,878 | 4/1974 | Lindstrom | 75/222 |

OTHER PUBLICATIONS

Hausner, Handbook of Powder Metallurgy, "Principles of Powder Metallurgy", FIG. 1.23, p. 7, 1973.

*Primary Examiner*—Brooks H. Hunt
*Assistant Examiner*—J. L. Barr
*Attorney, Agent, or Firm*—Pennie & Edmonds

[57] ABSTRACT

A process for the manufacture of sintered metal bodies, comprising the steps of providing a mixture of a powdered metal or alloy and at least one pore-forming filler which is a fine grained salt, vaporizable at the sintering temperature of the metal or alloy, heating the mixture to the sintering temperature of the metal or alloy under vacuum, whereby the filler vaporizes from the metal to leave the porous sintered metal body behind, and recovering the porous sintered metal body is disclosed. The sintered metal bodies are particularly useful for production of battery electrodes.

33 Claims, No Drawings

PROCESS FOR THE MANUFACTURE OF SINTERED METAL BODIES, IN PARTICULAR BATTERY ELECTRODES

This invention relates to a process for the manufacture of sintered metal bodies, in particular battery electrodes, in which at least one powdered metal or alloy is mixed with at least one pore-forming filler, the mixture is heated to the sintering temperature of the metal in an environment which is substantially inert for the metal, and the filler is subsequently removed from the metal, leaving the sintered metal body behind.

Sintered metal bodies have continually gained in importance in recent years. They are excellent for use as filters. Electrodes made of sintered material are particularly valuable; they can be used in accumulators and batteries and may also be of interest for fuel cells. Sintered nickel electrodes are particularly worthy of mention.

Numerous processes are available for the manufacture of porous sintered metal bodies, especially also for the manufacture of sintered nickel electrodes. Reference may be had in this connection to the publication by Albrecht Kirste entitled "Poröse Sintermetalle" in the Journal VTI-Z 116 (1974), pages 1272 et seq, and the publication by D. M. Drazic et al entitled "Einfluss einiger Herstellungsbedingungen auf die Kapazität gesinterter Nickelelektroden für alkalische Akkumulatoren" in the Journal Metalloberfläche 24 (1970), pages 76 and 77. In these processes, sintered bodies having the desired high porosity are obtained by mixing finely powdered metal with binders and pore forming materials. The binders and pore forming materials are generally made of an organic material which undergoes combustion during the sintering process. Since combustion must be carried out in an oxidizing atmosphere, the sintered body must be after-treated in a reducing atmosphere. Moreover, it is frequently impossible to prevent impurities being left in the sintered body. It is also known to compact the metal powder mechanically in order to impart a certain structure to it before it is sintered. This compacting process, however, has a deleterious effect on the porosity of the sintered body, particularly if no pore forming materials are used.

It is an object of this invention to provide a process for the manufacture of sintered metal bodies which can be carried out in a few steps and produces sintered bodies which have a high degree of purity, a large surface area and high porosity. The process is in particular intended for the production of sintered bodies which are suitable for use as electrodes.

The invention is characterised in that the filler used for forming the pores is a fine grained salt which vapourises at the sintering temperature, and sintering of the metal is carried out with simultaneous vapourisation of the salt under vacuum.

The employment of a volatile salt eliminates the necessity for combustion of the filler; at the same time, the vacuum serves as a protective gas atmosphere so that no special reducing gas or inert gas is required. Sintering of the metal powder and vapourisation of the salt are carried out substantially simultaneously, thus dispensing with the plurality of successive operations frequently required in known processes. The sintering temperature employed depends on the nature of the metal to be sintered and may vary from 300° C. to 1200° C. It is preferred to maintain a vacuum of at least $10^{-2}$ bar; a vacuum of from $10^{-3}$ bar to $10^{-6}$ bar has proved to be most suitable for vapourisation of the salt.

If it is not intended that any reaction should take place between the salt and the metal, it is advantageous to use a salt which is compatible with the metal, in particular a halide. Metal halides can be used successfully, in particular sodium chloride.

The metals which may be used for producing the sintered metal bodies by the process according to the invention include, inter alia, copper, silver, manganese, cobalt and particularly iron and nickel and mixtures thereof. Mond nickel is particularly suitable for producing sintered electrodes. The metal powder and powdered salt should be mixed and used in a substantially dry form. This not only enables the mixture to be rapidly heated but is also able to prevent a change in the particle size of the salt due to recrystallisation or caking, especially in the case of soluble salts. In contrast to many known processes, in the process according to the invention the mixture of powdered metal and salt is subjected to the sintering process without being first compressed. The mixture may be loosely poured into the sintering mould, any excess being simply wiped off. If desired, an electrode support may be embedded in the salt and metal powder mixture and sintered in with it.

The ratio by weight of metal to salt may be varied according to the purpose for which the sintered body is intended, and is generally between about 1:0.5 and 1:3, preferably between 1:1.15 and 1:5. The mixture generally contains a larger proportion by weight of salt than metal.

The particle size of the powdered salt and powdered metal may also be chosen according to the purpose for which the sintered body is to be used, the particle size of the salt being generally greater than that of the metal. If the sintered body is to be used as electrode, sufficiently large cavities and pores are required for introduction of the active electrode material. The particle size of the metal powder is preferably below 50 $\mu$m, preferably between about 2 $\mu$m and 15 $\mu$m, and the particle size of the salt powder is preferably between about 40 $\mu$m and 100 $\mu$m. The particle size of each of the two components and the proportions between them also depend upon the nature of the metal and of the salt. The sintering process may also be affected by the vapourisation point of the salt and can therefore be influenced by the choice of salt. As a rule, the salt used for any particular metal or metal alloy is chosen so that vapourisation of the salt only sets in to any marked degree when the sintering process has already progressed to a stage at which the metal structure has already attained a certain inherent stability. The vapourisation temperature of the salt may also be influenced by the height of the vacuum. The vacuum may be raised to a value of between $10^{-3}$ and $10^{-6}$ bar, at least towards the end of the sintering process, and maintained there to ensure complete removal of volatile constituents.

Vapourisation of the salt is generally effected by sublimation and the salt is preferably deposited in a cooler part of the vacuum furnace. If desired, this salt can be re-used, in which case one can be sure that the salt is freed from unwanted impurities and non-volatile constituents.

The sintered bodies manufactured by the process according to the invention are eminently suitable for use as electrodes or electrode supporting structures for primary and secondary batteries as well as fuel cells, and as filter inserts, sound absorbing materials, absorbers, mechanical shock absorbers, supports for self consuming electrodes, for corrosion preventing installations, and the like. If the sintered body is to be used as electrode, it is preferably slightly compacted after the sintering process, and at the same time stamped so that grooves are formed on it for the discharge of gas. The degree to which it is compacted depends on the nature of the metal. Sintered iron bodies, for example, may be compacted by up to 100% whereas sintered nickel bodies are only compacted by from 5 to 20%. This after-treatment also has the effect of strengthening the sintered body.

When powdered nickel is sintered for the manufacture of a positive nickel electrode, deposition of nickel hydroxide in the pores of the sintered body is preferably carried out in an electrolytic bath containing from 120 to 600 g/l of nickel nitrate and maintained at a pH of from 1 to 3 by the addition of nitric acid. The bath may advantageously also contain cobalt nitrate in a quantity of up to 60 g/l. Deposition of the nickel hydroxide is advantageously carried out at temperatures of from 85° to 95° C. The current density is preferably between about 5 A/dm$^2$ and 15 A/dm$^2$, the electrode which is to be impregnated being connected as the cathode. The high concentration of nickel salt, the high temperature at which electrolysis is carried out and the high current density combine to effect rapid and efficient deposition of nickel hydroxide to produce powerful electrodes having a high ampere hour capacity. The concentration of nickel and cobalt ions is constantly controlled and can be maintained within the given limits by the regeneration of the bath or by using self-consuming nickel electrodes. The positive auxiliary electrodes may be surrounded by pocket separators closed on three sides to prevent contamination of the bath.

After impregnation of the sintered nickel body by electrodeposition, the resulting electrode is preferably neutralised by immersion in 30% potassium hydroxide solution at elevated temperature and then activated by immersion in ammonium persulphate solution at room temperature.

The following Examples illustrate the invention:

EXAMPLE 1

Mond nickel composed of particles measuring from 4 to 7 μm is mixed in a ratio by weight of 1:1.5 with finely ground sodium chloride composed of particles corresponding to the screen fraction 42 to 100 μm. The dry powder mixture is loosely poured into a suitably sized sintering mould, any excess being wiped off. When the mould has been filled, it is introduced into a vacuum furnace which is evacuated by a pump to a vacuum of $5.10^{-3}$ bar before it is heated. The furnace is first heated to 800° C. and after one hour at this temperature it is heated to 1100° C. and maintained at this temperature for one hour, the vacuum pump being kept in continuous operation during this time. A substantially constant vacuum is established at about $10^{-5}$ bar. When the salt has completely sublimed from the sintering mixture and settled in a cool part of the vacuum furnace, the furnace is left to cool and the vacuum is thereupon reduced to normal pressure. The sintered body obtained can then be removed from the furnace and processed in the desired manner.

EXAMPLE 2

The sintered body obtained according to Example 1 is used for the production of a positive nickel hydroxide electrode. For this purpose, it is first treated with a combined stamping and cutting tool to cut off protruding edges and impart to the surface of the electrode a pattern of grooves extending parallel to each other from top to bottom to facilitate the conducting away of gas. The sintered body is then immersed as cathode in an electrolytic bath containing 500 g/l of $Ni(NO_3)_2.6H_2O$ and 30 g/l of $Co(NO_3)_2.6H_2O$ in nitric acid solution. The bath is at pH 2.

Deposition of nickel hydroxide is then carried out at a bath temperature of 90° C. and a current density of 10 A/dm$^2$. Nickel plates are used as positive auxiliary electrodes and the pH is maintained by constant addition of nitric acid. Deposition of the active nickel hydroxide mass proceeds relatively rapidly. It is known from experience that to deposit a quantity of active electrode compound having the theoretical storage capacity of 1 ampere hour, it is necessary to supply from 2 to 5 ampere hours of electrolytic current. Deposition of the nickel hydroxide is generally carried out over a period of from 2 to 5 hours. After the deposition of nickel hydroxide, the impregnated electrode is neutralised with 30% potassium hydroxide solution at a temperature of 55° C. and then activated in a two molar ammonium persulphate solution at ambient temperature for one hour.

EXAMPLE 3

A fine iron carbonyl powder having a particle size of less than 20 μm is mixed in a ratio by weight of 1.06:1 with finely milled sodium chloride composed of particles corresponding to the screen fraction 42 μm to 100 μm. The dry powder mixture is loosely poured into a suitably sized sintering mould, and the excess is wiped off. The filled mould is then introduced into the vacuum furnace which is evacuated to a vacuum of $5.10^{-3}$ bar before it is heated. It is then heated to 800° C. and kept at this temperature for 30 minutes before the temperature is raised to 1150° C. and the electrode bodies are sintered for 30 minutes. At this temperature, the vacuum is in the region of $10^{-4}$ to $5.10^{-5}$ bar. After cooling, the electrode is cut down to its final dimensions, gas conducting grooves are stamped into it, and the electrode is installed in the battery.

What is claimed is:

1. A process for the manufacture of sintered metal bodies comprising mixing a powdered metal or metal alloy with at least one pore-forming filler, said filler being a fine grain salt or mixture of salts, filling a mold with said mixture, heating the uncompressed mixture to the sintering temperature of the metal or metal alloy, reducing the pressure of the atmosphere surrounding said mold during said heating, the salt of said mixture being vaporizable under the conditions of sintering, said salt of the mixture being selected such that significant vaporization thereof occurs only after sintering of the metal has begun, continuing such heat and reduced pressure for a period of time sufficient to vaporize substantially all of said salt and sinter the metal or alloy into a porous body, and recovering the porous sintered metal.

2. A process for the manufacture of a positive sintered nickel electrode comprising the steps of providing a mixture of powdered nickel and a fine-grained salt vapourisable at the sintering temperature of the nickel, pouring said mixture into a sintering mould, embedding an electrode support in said mixture, sintering said uncompressed mixture with said electrode support therein under a vacuum, compacting the resultant body and providing in said body gas discharge grooves, and electrochemically depositing nickel hydroxide on the porous sintered nickel electrode used as cathode in an electrolytic bath containing nickel nitrate of the formula $Ni(NO_3)_2.6H_2O$ and optionally cobalt nitrate of the formula $Co(NO_3)_2.6H_2O$ in nitric acid solution, in which in that the deposition in the pores of the nickel cathode is carried out in a bath which contains from 120 g/l to 600 g/l of nickel nitrate and at the most 60 g/l of cobalt nitrate and which is maintained at a pH in the range of from 1 to 3 by the addition of nitric acid to provide a positive sintered nickel electrode.

3. A process as claimed in claim 1 in which the sintering is carried out at a temperature of between 300° C. and 1200° C.

4. A process as claimed in claim 1 in which a vacuum of at least $10^{-2}$ bar is maintained during the sintering process.

5. A process as claimed in claim 1 in which a vacuum of from $10^{-3}$ to $10^{-6}$ bar is maintained during the sintering process.

6. A process as claimed in claim 1 in which a salt which is compatible with the metal is used as filler.

7. A process as claimed in claim 6 in which the salt is a halide.

8. A process as claimed in claim 7 in which the halide is a metal halide.

9. A process as claimed in claim 8 in which the halide is a sodium chloride.

10. A process as claimed in claim 1 in which the metals which are sintered are iron and nickel and mixtures thereof.

11. A process as claimed in claim 1 in which the metals which are sintered are copper, silver, manganese and/or cobalt.

12. A process as claimed in claim 1 in which the mixture of powdered metal and salt is used in a substantially dry form.

13. A process as claimed in claim 1 in which an electrode support is embedded in the mixture of powdered metal and salt and is sintered in with it.

14. A process as claimed in claim 1 in which the ratio by weight of metal to salt in the mixture is between 1:0.5 and 1:3, preferably between 1:1.15 and 1:5.

15. A process as claimed in claim 1 in which the metal powder is used in the form of particles measuring of up to 50 $\mu$m in size.

16. A process as claimed in claim 1 in which the particles of the metal powder have a size from 2 to 15 $\mu$m.

17. A process as claimed in claim 1 in which the powdered salt is used in a particle size of from 40 $\mu$m to 100 $\mu$m.

18. A process as claimed in claim 1 for the manufacture of a sintered iron electrode in which in that the particle size of the iron powder in the mixture is from 2 to 10 $\mu$m and the particle size of the salt powder is from 42 to 100 $\mu$m.

19. A process as claimed in claim 18 in which there is used an iron powder, one to which has been added approximately 1% by weight of iron sulphide powder (FeS).

20. A process as claimed in claim 1 for the manufacture of a sintered nickel electrode, in which the particle size of the nickel powder is 2 to 7 $\mu$m and the particle size of the salt powder is from 42 to 100 $\mu$m.

21. A process as claimed in claim 1 in which the vacuum is raised in the course of the sintering process.

22. A process as claimed in claim 1 in particular for the manufacture of sintered electrodes, including the step of compacting the sintered body obtained by the sintering process to between 95 and 50% of its original height before subsequent impregnation, and this compacting operation is preferably accompanied by the stamping in of parallel gas discharge grooves.

23. A process for the manufacture of a positive sintered nickel electrode by electrochemical deposition of nickel hydroxide on a porous sintered nickel electrode used as cathode in an electrolytic bath containing nickel nitrate of the formula $Ni(NO_3)_2.6H_2O$ and optionally cobalt nitrate of the formula $Co(NO_3)_2.6H_2O$ in nitric acid solution, in which in that the deposition in the pores of the nickel cathode is carried out in a bath which contains from 120 g/l to 600 g/l of nickel nitrate and at the most 60 g/l of cobalt nitrate and which is maintained at a pH in the range of from 1 to 3 by the addition of nitric acid.

24. A process as claimed in claim 23 in which the electrolysis is carried out at temperatures of from 85° to 95° C.

25. A process as claimed in claim 24 in which a temperature of 90° to 95° C. is used.

26. A process as claimed in claim 23 in which the electrolysis is carried out at a current density of from 5 A/dm$^2$ to 15 A/dm$^2$.

27. A process as claimed in claim 26 in which a current density of approximately 10 A/dm$^2$ is used.

28. A process as claimed in claim 23 in which the bath is kept in continuous motion and is regenerated and filtered outside its container.

29. A process as claimed in claim 23 in which the positive auxiliary electrodes used are graphite fleeces or plates.

30. A process as claimed in claim 23 in which in that the positive auxiliary electrodes used are nickel plates functioning as self consuming electrodes.

31. A process as claimed in claim 23 in which the positive auxiliary electrodes used are nickel plates produced from compacted nickel scrap.

32. A process as claimed in any of claims 23 to 31 in which in that the positive auxiliary electrodes are enveloped by pocket separators closed on three sides to prevent contamination of the bath electrolytes.

33. A process as claimed in any of claims 23 to 32 in which after electrolytic impregnation with nickel hydroxide, the sintered electrode is neutralised by immersion in 30% potassium hydroxide solution at 50° to 60° C. and then activated by immersion in 2 molar ammonium persulphate solution for approximately one hour at room temperature.

* * * * *